United States Patent
Kawamoto et al.

(10) Patent No.: US 8,009,621 B2
(45) Date of Patent: Aug. 30, 2011

(54) RADIO COMMUNICATION SYSTEM, METHOD AND BASE STATION WITH CONTROLLED TRANSMISSION RATE

(75) Inventors: Junichiro Kawamoto, Tokyo (JP); Akihito Hanaki, Yokohama (JP); Takahiro Hayashi, Yokosuka (JP); Yoshikazu Goto, Yokosuka (JP); Yukiko Takagi, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 373 days.

(21) Appl. No.: 12/244,028

(22) Filed: Oct. 2, 2008

(65) Prior Publication Data
US 2009/0093256 A1     Apr. 9, 2009

(30) Foreign Application Priority Data
Oct. 4, 2007 (JP) .................. 2007-261151

(51) Int. Cl.
*H04W 4/00* (2009.01)
*G01R 31/08* (2006.01)
*H04B 7/00* (2006.01)

(52) U.S. Cl. ........ 370/329; 370/230; 370/232; 455/512; 455/515

(58) Field of Classification Search ............ 455/512, 455/513, 515; 370/232, 329, 395.65, 230
See application file for complete search history.

(56) References Cited

U.S. PATENT DOCUMENTS

| | | | |
|---|---|---|---|
| 7,522,924 B2* | 4/2009 | Abeta et al. ............ | 455/452.2 |
| 7,660,279 B2* | 2/2010 | Brueck et al. ........... | 370/328 |
| 7,804,850 B2* | 9/2010 | Sebire et al. ............ | 370/468 |
| 2006/0215604 A1* | 9/2006 | Mueckenheim et al. ... | 370/329 |
| 2007/0047451 A1* | 3/2007 | Lohr et al. ............. | 370/242 |
| 2007/0109964 A1* | 5/2007 | Kwak et al. ............ | 370/230 |
| 2007/0297360 A1* | 12/2007 | Joachim et al. ......... | 370/329 |
| 2008/0214197 A1* | 9/2008 | Englund et al. ......... | 455/450 |

FOREIGN PATENT DOCUMENTS

EP   1 335 621 A1   1/2003

(Continued)

OTHER PUBLICATIONS

"Universal Mobile Telecommunications System (UMTS); Enhanced uplink;Overall description; Stage 2 (3GPP TS 25.319 version 7.2.0 Release 7); ETSI TS 125 319" ETSI Standards, LIS, Sophia Antipolis Cedex, France, vol. 3-R2 No. V7.2.0, Mar. 1, 2007, XP014037911.

(Continued)

*Primary Examiner* — Rafael Pérez-Gutiérrez
*Assistant Examiner* — Allahyar Kasraian
(74) *Attorney, Agent, or Firm* — Marvin A. Motsenbocker; Mots Law, PLLC

(57) ABSTRACT

The radio terminal 10 includes a communication unit 11 configured to transmit a happy bit to the base station. The base station 100 includes: a comparison unit 126 configured to compare a priority class assigned to a control target terminal with a priority class assigned to a comparison target terminal; a first determination unit 127 configured to determine whether a happy bit rate is lower than a predetermined threshold; and a scheduling unit 120a configured to transmit, to the control target terminal, transmission rate decrease data for decreasing the transmission rate, when the priority class assigned to the control target terminal is lower than the priority class assigned to the comparison target terminal and when the happy bit rate is lower than the predetermined threshold.

6 Claims, 7 Drawing Sheets

FOREIGN PATENT DOCUMENTS

| | | |
|---|---|---|
| EP | 1 775 982 A1 | 10/2006 |
| JP | 2002-199435 A | 7/2002 |
| JP | 2007-053747 A | 3/2007 |

OTHER PUBLICATIONS

"Rate-request proposal" 3GPP Draft; R2-050179 Rate-Request Discussion Document V7, 3rd Generation Partnership Project (3GPP), Mobile Competence Centre; 650, Route Des Lucioles; F-06921 Sophia-Antipolis Cedex France, vol. Tog_ran/WG2_RL2/TSGR2_45bis/Docs, no.Sophia Antipolis, France 2005110, Jan. 2006, 2005N ZP05012745.

Orejuela Mesa, C et al.:"Scheduling in the UMTS enhaced uplink" Cost 290, TD(06)052, Sep. 29, 2006, pp. 1-17, XP002510586.

Samsung Electronics; "Description of EUL scheduler" 3rd Generation Partenership Project, Jun. 21, 2004 p. 1-8, XP002510585.

3GPP TS 25.321 V6.13.0 (Jun. 2007), 3rd Generation Partnership Project; Technical Specification Group Radio Access Network; Medium Access Control (MAC) protocol specification (Release 6), 94 pages.

3GPP TS 25.321 V7.5.0 (Jun. 2007), 3rd Generation Partnership Project; Technical Specification Group Radio Access Network; Medium Access Control (MAC) protocol specification (Release 7), 141 pages.

* cited by examiner

RADIO COMMUNICATION SYSTEM, METHOD AND BASE STATION WITH CONTROLLED TRANSMISSION RATE

CROSS REFERENCE TO RELATED APPLICATION

This application is based upon and claims the benefit of priority from prior Japanese Patent Application No. 2007-261151, filed on Oct. 4, 2007; the entire contents of which are incorporated herein by reference.

BACKGROUND OF THE INVENTION

1. Field of the Invention

The present invention relates to a radio communication system, a radio communication method and a base station, in which a base station transmits, to a radio terminal, transmission rate control data for controlling a transmission rate of uplink user data.

2. Description of the Related Art

Heretofore, a radio communication system including a base station and a radio network controller has been known. In the radio communication system, the base station has a single or multiple cells, and a radio communication is performed between each of the cells and a plurality of radio terminals. The radio network controller controls a plurality of base stations, and assigns a radio resource to the plurality of the radio terminals. Note that such a technique (hereinafter referred to as first technique) is sometimes referred to as R99 (Release 99) or the like.

For the purpose of improving the throughput and shortening the delay time, and the like, there has recently been proposed a technique in which a base station assigns the radio resource to uplink user data transmitted from each of the radio terminals to the base station (network side). Note that such a technique (hereinafter referred to as a second technique) is sometimes referred to as the high speed uplink packet access (HSUPA), the enhanced uplink (EUL) or the like.

In the above-described second technique, each of the radio terminals transmit uplink user data to the base station via an enhanced dedicated physical data channel (E-DPDCH). A transport block size (TBS) is determined based on the transmission rate (for example, a scheduling grant (SG)) of the uplink user data, and is controlled by an absolute grant (AG) and a relative grant (RG), which are transmitted from the base station to each of the radio terminals.

Here, the radio terminals can transmit a happy bit to the base station. The happy bit indicates whether the SG controlled by the AG or the RG is sufficient for each of the radio terminals. The happy bit includes "Happy" indicating that the SG is sufficient for the radio terminals, and "Unhappy" indicating that the SG is not sufficient for the radio terminals (for example, see 3GPP TS25.321 Ver. 7 11.8.1.5 "Happy Bit Setting").

When a happy bit rate, which indicates a ratio of "Happy" to all of the transmitted happy bit (hereinafter referred to as "Happy Bit Rate") is lower than a predetermined threshold, the base station increases the SG to be assigned to the radio terminal.

SUMMARY OF THE INVENTION

However, in the above-described second technique, the SG to be assigned to one radio terminal is merely controlled based on the happy bit received from the one radio terminal. Specifically, since conditions of other radio terminals are not considered in the second technique, the radio resource is not properly assigned to each of the radio terminals.

One aspect of the present invention is summarized as a radio communication system in which a base station transmits, to a radio terminal, transmission rate control data for controlling a transmission rate of uplink user data; including the following configuration. The radio terminal includes a terminal side transmitting unit (communication unit 11) configured to transmit, to the base station, control data indicating whether the transmission rate assigned to the radio terminal is sufficient. The base station includes a comparison unit (comparison unit 126) configured to compare a priority class assigned to a control target terminal with a priority class assigned to a comparison target terminal, the control target terminal being a radio terminal whose transmission rate is to be controlled and the comparison target terminal being a radio terminal whose transmission rate is to be compared with the control target terminal; a first determination unit (first determination unit 127) configured to determine whether a happy bit rate is lower than a predetermined threshold, the happy bit rate being a ratio of control data indicating that the transmission rate is sufficient for the comparison target terminal, to all of the control data received from the comparison target terminal; and a base station side transmitting unit (communication unit 110 and scheduling unit 120a) configured to transmit, to the control target terminal, transmission rate decrease data for decreasing the transmission rate, when the priority class assigned to the control target terminal is lower than the priority class assigned to the comparison target terminal and when the happy bit rate is lower than the predetermined threshold.

According to this aspect, the base station side transmitting unit determines whether or not to transmit the transmission rate decrease data to the control target terminal, based on the comparison result of the priority class between the control target terminal and the comparison target terminal, and the happy bit rate of the control target terminal and the comparison target terminal.

Accordingly, the radio resource can be properly assigned to the plurality of radio terminals, compared with controlling the transmission rate to be assigned to one of the plurality of radio terminals simply based on the control data received from the one of the plurality of radio terminals.

In the above-described aspect, the base station further includes a second determination unit (second determination unit 128) configured to determine whether or not to decrease the transmission rate assigned to the control target terminal, based on a current transmission rate assigned to the control target terminal. The transmission of the transmission rate decrease data to the control target terminal is regulated when the second determination unit determines not to decrease the transmission rate assigned to the control target terminal, even when the priority class assigned to the control target terminal is lower than the priority class assigned to the comparison target terminal and when the happy bit rate is lower than the predetermined threshold.

In the above-described aspect, the base station further includes a weighting unit (weighting unit 129) configured to perform a weighting on the priority class assigned to the control target terminal and on the priority class assigned to the comparison target terminal, by use of a weighted value determined based on a criterion different from the priority class, and to acquire a weighted priority class of the control target terminal and a weighed priority class of the comparison target terminal. The comparison unit compares the weighted priority class of the control target terminal with the weighted priority class of the comparison target terminal. The base station side transmitting unit transmits the transmission rate decrease data to the control target terminal when the weighted priority class assigned to the control target terminal is lower than the weighted priority class assigned to the comparison target terminal and when the happy bit rate is lower than the predetermined threshold.

In the above-described aspect, the base station further includes a selection unit (selection unit 125) configured to select the control target terminal and the comparison target terminal based on a predetermined selection criterion.

One aspect of the present invention is summarized as a radio communication method in which a base station transmits, to a radio terminal, transmission rate control data for controlling a transmission rate of uplink user data, the method including: transmitting, from the radio terminal to the base station, control data indicating whether a transmission rate assigned to the radio terminal is sufficient; comparing, at the base station, a priority class assigned to a control target terminal with a priority class assigned to a comparison target terminal, the control target terminal being a radio terminal whose transmission rate is to be controlled and the comparison target terminal being a radio terminals whose transmission rate is to be compared with the control target terminal; determining, at the base station, whether a happy bit rate is lower than a predetermined threshold, the happy bit rate being a ratio of control data indicating that the transmission rate is sufficient for the comparison target terminal, to all of the control data received from the comparison target terminal; and transmitting, from the base station to the control target terminal, transmission rate decrease data for decreasing the transmission rate, when the priority class assigned to the control target terminal is lower than the priority class assigned to the comparison target terminal and when the happy bit rate is lower than the predetermined threshold.

One aspect of the present invention is summarized as a base station configured to transmit, to a radio terminal, transmission rate control data for controlling a transmission rate of uplink user data, including: a receiving unit (communication unit 110) configured to receive, from the radio terminal, control data indicating whether a transmission rate assigned to the radio terminal is sufficient, a comparison unit (comparison unit 126) configured to compare a priority class assigned to a control target terminal with a priority class assigned to a comparison target terminal, the control target terminal being a radio terminal whose transmission rate is to be controlled and the comparison target terminal being a radio terminals whose transmission rate is to be compared with the control target terminal; a first determination unit (first determination unit 127) configured to determine whether a happy bit rate is lower than a predetermined threshold, the happy bit rate being a ratio of control data indicating that the transmission rate is sufficient for the comparison target terminal, to all of the control data received from the comparison target terminal; and a base station side transmitting unit (communication unit 110 and scheduling unit 120a) configured to transmit, to the control target terminal, transmission rate decrease data for decreasing the transmission rate, when the priority class assigned to the control target terminal is lower than the priority class assigned to the comparison target terminal and when the happy bit rate is lower than the predetermined threshold.

DESCRIPTION OF THE EMBODIMENTS

Figure 1:
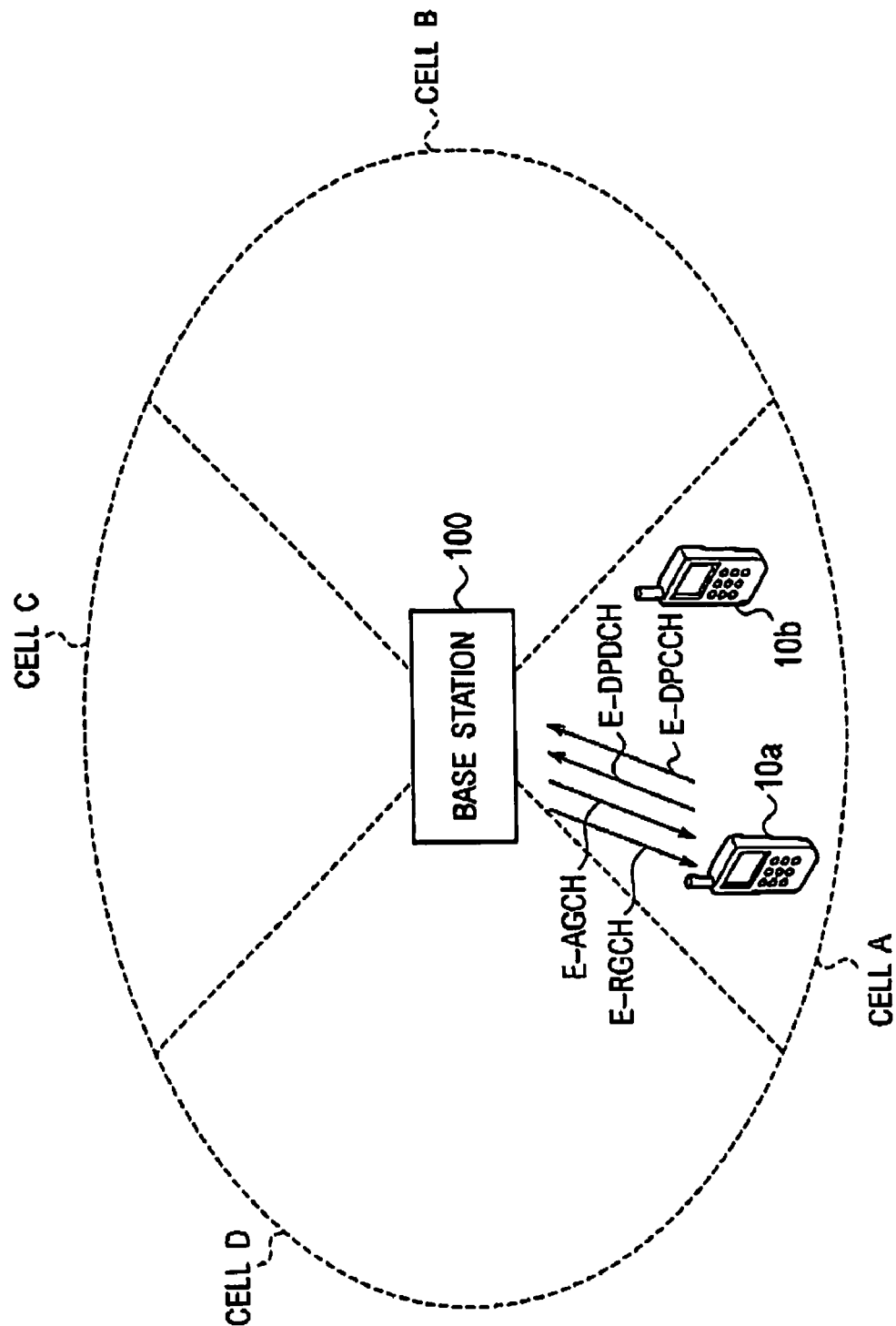
FIG. 1 is a view showing a radio communication system according to a first embodiment.

With reference to the drawings, a radio communication system according to an embodiment of the present invention will be described below. Note that, in the following description of the drawings, the same or similar parts will be denoted by the same or similar reference numerals.

However, it should be noted that the drawings are schematic and ratios of dimensions and the like are different from actual ones. Therefore, specific dimensions and the like should be determined by taking into consideration the following description. Moreover, as a matter of course, also among the drawings, there are included portions in which dimensional relationships and ratios are different from each other.

First Embodiment (Configuration of Radio Communication System)

With reference to the accompanying drawings, a configuration of a radio communication system according to a first embodiment will be described below. FIG. 1 is a view showing the radio communication system according to the first embodiment. As shown in FIG. 1, the radio communication system includes a plurality of radio terminals 10 (a radio terminal 10a, a radio terminal 10b, or the like) and a base station 100.

The radio terminal 10 transmits uplink user data to the base station 100. Specifically, the radio terminal 10 transmits the uplink user data to the base station 100 via a dedicated physical data channel (DPDCH) in a framework in which a radio network controller assigns a radio resource and the like. Note that such framework is sometimes referred to as R99 (Release 99) or the like.

In this framework, the radio terminal 10 transmits uplink control data to the base station 100 via a dedicated physical control channel (DPCCH).

Meanwhile, the radio terminal 10 transmits uplink user data to the base station 100 via an enhanced dedicated physical data channel (E-DPDCH), in a framework in which the base station 100 assigns a radio resource and the like. Note that this framework is sometimes referred to as the high speed uplink packet access (HSUPA), the enhanced uplink (EUL) or the like.

Here, the uplink user data is divided into blocks for each transmission time interval (TTI), that is, for each process (HARQ process). Each of the blocks (MAC-e PDU) is transmitted by use of a process (hereinafter referred to as an active process) assigned to the radio terminal 10.

Moreover, one cycle (HARQ RTT) is configured of a predetermined number of processes (process #1 to process #n) and each of the cycle is repeated. Note that the number of processes included in one cycle is set according to a TTI length. For example, when the TTI length is 2 ms, the number of processes included in one cycle is "8". When the TTI length is 10 ms, the number of processes included in one cycle is "4".

Here, the radio terminal 10 has a table associating a transmission power ratio with the transmission rate. This table is used for transmitting the uplink user data via the E-DPDCH. The transmission power ratio is a ratio of a transmission power of the E-DPDCH to a transmission power of the DPCCH (E-DPDCH/DPCCH). The transmission rate is represented by a transport block size (TBS).

The transmission power ratio assigned to the radio terminal 10 will be hereinafter referred to as a scheduling grant (SG). Note that the transmission power ratio and the transmission rate are associated one-to-one with each other. Thus, the scheduling grant (SG) may be considered not only as a term representing the transmission power ratio assigned to the radio terminal 10 but also as a term representing the transmission rate assigned to the radio terminal 10.

Note that, as described later, the radio terminal 10 updates the SG according to transmission rate control data (AG or RG) received from the base station 100 (see 3GPP TS26.321 Ver. 7.5.0 11.8.1.3 "Scheduling grant Update"). Subsequently, the radio terminal 10 determines a transmission rate (that is, TBS) corresponding to the SG by referring to the table associating the transmission power ratio with the transmission rate (see 3GPP TS25.321 Ver. 7.5.0 11.8.1.4 "E-TFC Selection").

In a framework in which the base station 100 assigns the radio resource and the like, the radio terminal 10 transmits uplink control data to the base station 100 via the enhanced dedicated physical control channel (E-DPCCH) or the like. The uplink control data includes a happy bit and the like. Here, the happy bit indicates whether the SG assigned to the radio terminal 10 is sufficient for the radio terminal 10. The happy bit includes "Happy" indicating that SG assigned to the radio terminal 10 is sufficient, and "Unhappy" indicating that the SG assigned to the radio terminal 10 is not sufficient. Note that the happy bit is expressed by 1 bit.

The base station 100 controls a plurality of cells (cells A to D), and each of the plurality of cells communicates with the radio terminal 10 located in the each of the plurality of cells. Each of the cells can function as a serving cell, or a non-serving cell.

Note that the "cell" is basically used as a term representing a function communicating with the radio terminal 10. The "cell" is sometimes used as a term representing an area within which the radio terminal 10 is located.

For example, in FIG. 1, the radio terminal 10a performs a communication according to an instruction from an EUL scheduler provided in the cell A (in other words, the radio terminal performs a communication according to an AG received from the cell A via E-AGCH). In this example, the cell A is a serving cell for the radio terminal 10a and the cells B to D are non-serving cells for the radio terminal 10a. Meanwhile, the radio terminal 10a is referred to as a serving terminal for the cell A and as a non-serving terminal for the cells B to D.

The base station 100 receives uplink user data from the radio terminal 10 via the data channel such as the DPDCH or the E-DPDCH. Meanwhile, the base station 100 transmits, to the radio terminal 10, transmission rate control data for controlling a transmission rate of the uplink user data to be transmitted via the E-DPDCH. Note that the transmission rate control data includes an absolute grant (AG) for controlling an absolute value of the transmission rate, and a relative grant (RG) for controlling a relative value of the transmission rate.

The absolute grant (AG) is data (Index) directly specifying the transmission power ratio (E-DPDCH/DPCCH) to be assigned to the radio terminal 10 (see 3GPP TS25.212 Ver.7.5.0 4.10.1A.1 "Information field mapping of the Absolute Grant Value").

As described above, the absolute grant (AG) is a command directly specifying the transmission rate value without relying on the current transmission rate.

The relative grant (RG) is data ("Up", "Down" and "Hold") relatively specifying the transmission power ratio (E-DPDCH/DPCCH) assigned to the radio terminal 10 (see 3GPP TS25.321 Ver.7.5.0 9.2.5.2.1 "Relative Grants").

As described above, the relative grant (RG) is a command relatively controlling the current transmission rate. Specifically, the relative grant (RG) includes an increase command "Up" for instructing an increase of the current transmission rate, a retention command "Hold" for instructing a retention of the current transmission rate, and a decrease command "Down" for instructing a decrease of the current transmission rate. Here, the increase command instructs the increase of the transmission rate by a predetermined amount. Further, the decrease command instructs the decrease of the transmission rate by a predetermined amount. The predetermined amount for the increase may be the same as or smaller than the predetermined amount for the decrease.

The base station 100 transmits the absolute grant (AG) to the radio terminal 10 via an E-DCH absolute grant channel (E-AGCH). The base station 100 transmits the relative grant (RG) to the radio terminal 10 via an E-DCH relative grant channel (E-RGCH).

For example, the serving cell (here, the cell A) transmits the AG to the radio terminal 10 via the E-AGCH and transmits the RG to the radio terminal 10 via the E-RGCH. Meanwhile, the non-serving cell (here, the cell B) transmits the RG to the radio terminal 10 via the E-RGCH without transmitting the AG to the radio terminal 10 via the E-AGCH.

It should be note that, in FIG. 1, the channels (the DPDCH, the DPCCH and the like) used in the R99 are merely omitted for simplifying the description. It should also be noted that multiple number of the radio terminals 10 existed in each of the cells are omitted in the description.

Further, the cell used as the serving cell by the radio terminal 10 is not limited to one cell but may be more than one cell.

(Configuration of Radio Terminal)

Figure 2:
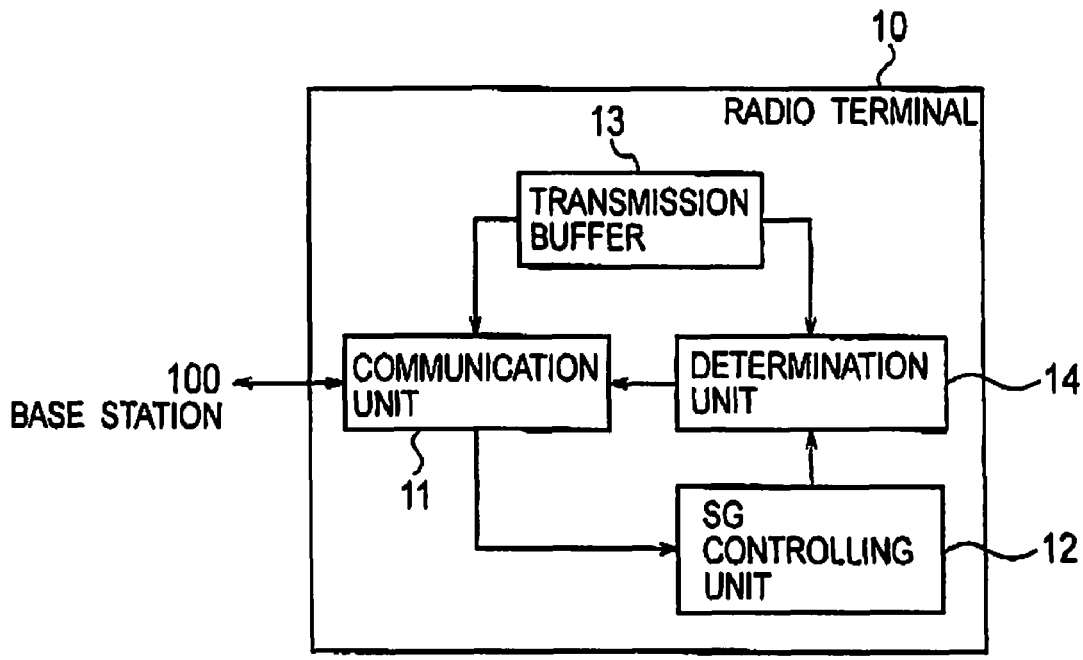
FIG. 2 is a block diagram showing a radio terminal 10 according to the first embodiment.

With reference to the accompanying drawings, description will be given of a configuration of the radio terminal according to the first embodiment. FIG. 2 is a block diagram showing the radio terminal 10 according to the first embodiment.

It should be noted that the plurality of radio terminals 10 is included in the radio terminal 10.

As shown in FIG. 2, the radio terminal 10 includes a communication unit 11, a SG controlling unit 12, a transmission buffer 13 and a determination unit 14.

The communication unit 11 communicates with the base station 100. Specifically, the communication unit 11 transmits the uplink user data to the base station 100 via the E-DPDCH. The communication unit 11 transmits the uplink control data (for example, the above-described happy bit) to the base station 100 via the E-DPCCH. Meanwhile, the communication unit 11 receives, from the base station 100, transmission rate control data (the AG, the RG, or the like) for controlling the transmission rate of the uplink user data.

The SG controlling unit 12 controls the SG assigned to the uplink user data. The SG controlling unit 12 has a table associating the transmission power ratio (SG) with the transmission rate (TBS).

As described above, the SG is controlled by the AG or the RG received from the base station 100. The transmission rate of the uplink user data is selected from a range not exceeding the TBS associated with the SG.

The transmission buffer 13 stores the uplink user data. The above-described communication unit 11 transmits the uplink user data stored in the transmission buffer 13.

The determination unit 14 determines whether or not the SG assigned to the radio terminal 10 is sufficient. For example, the determination unit 14 determines whether the SG assigned to the radio terminal 10 is sufficient, based on quality of service (QoS) required for the uplink user data, a buffer amount of the uplink user data stored in the transmission buffer 13, and the like.

When the SG assigned to the radio terminal 10 is sufficient, the determination unit 14 instructs the communication unit 11 to transmit the happy bit ("Happy") indicating that the SG assigned to the radio terminal 10 is sufficient. On the other hand, when the SG assigned to the radio terminal 10 is not sufficient, the determination unit 14 instructs the communication unit 11 to transmit a happy bit ("Unhappy") indicating that the SG assigned to the radio terminal 10 is not sufficient.

Here, the instruction to transmit "Unhappy" is given when the following conditions are met (see 3GPP TS25.321 Ver.7 11.8.1.5 "Happy Bit Setting"):

(1) The uplink user data is transmitted by TBS corresponding to an upper limit of the current SG assigned to the radio terminal 10.

(2) A transmission power corresponding to the current SG assigned to the radio terminal 10 is lower than a maximum transmission power.

(3) A time required for transmitting all the uplink user data stored in the transmission buffer 13 (a time required for transmission) is equal to or more than a predetermined delay time (Happy_Bit_Delay_Condition (ms)).

Here, the time required for the transmission can be calculated based on the following expression:

("the buffer amount (TEBS: Total E-DCH Buffer Status) of the transmission buffer 13"×"total number of processes included in one cycle""2×TTI length)/("TBS corresponding to SG"×"number of active processes").

(Configuration of Base Station)

Figure 3:
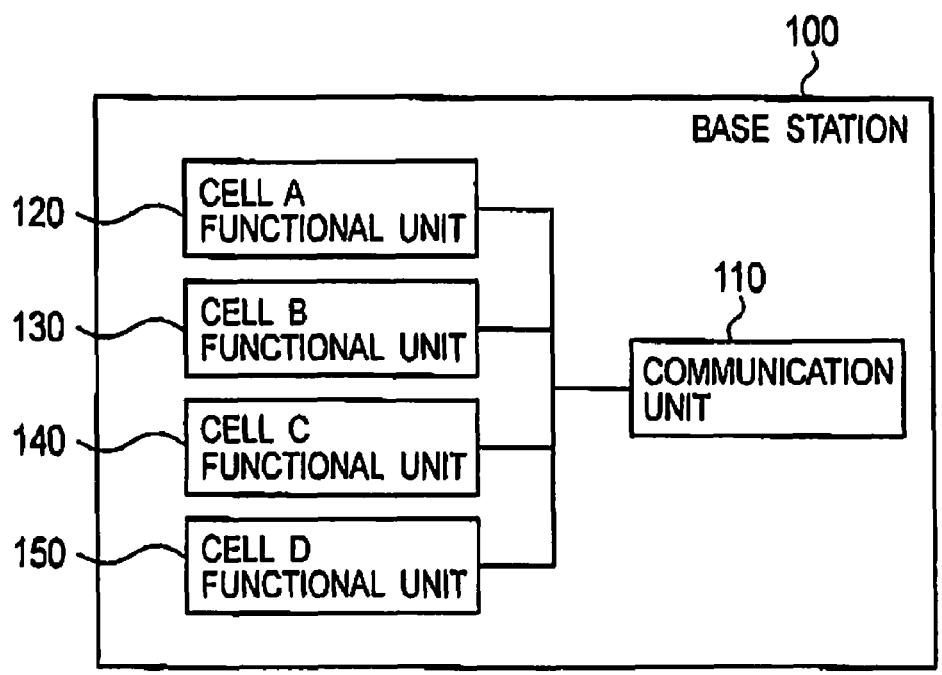
FIG. 3 is a block diagram showing a base station 100 according to the first embodiment.

With reference to the accompanying drawings, description will be given of a configuration of the base station according to the first embodiment. FIG. 3 is a block diagram showing the base station 100 according to the first embodiment.

As shown in FIG. 3, the base station 100 includes a communication unit 110, a cell A functional unit 120, a cell B functional unit 130, a cell C functional unit 140 and a cell D functional unit 150.

The communication unit 110 communicates with the radio terminal 10 located in the cells A to D. Here, the plurality of the radio terminals 10 is located in the cells A to D, respectively. Specifically, the communication unit 110 receives uplink user data from each of the plurality of radio terminals 10 via the data channel such as the DPDCH or the E-DPDCH. Further, the communication unit 110 receives uplink control data from each of the plurality of radio terminals 10 via the control channel such as the DPCCH or the E-DPCCH. Meanwhile, the communication unit 110 transmits the control data (AG or RG) to each of the plurality of radio terminals 10 via the control channel such as the E-AGCH and the E-RGCH.

Note that the communication unit 110 also communicates with upper apparatuses (such as a radio network controller, a switching apparatus or the like), which controls the base station 100.

The cell A functional unit 120 functions as a serving cell for radio terminals 10 located in the cell A. Meanwhile, the cell A functional unit 120 functions as a non-serving cell for radio terminals 10 located in the cells B to D.

The cell B functional unit 130 functions as a serving cell for radio terminals 10 located in the cell B. Meanwhile, the cell B functional unit 130 functions as a non-serving cell for radio terminals 10 located in the cells A, C and D.

The cell C functional unit 140 functions as a serving cell for radio terminals 10 located in the cell C. Meanwhile, the cell C functional unit 140 functions as a non-serving cell for radio terminals 10 located in the cells A, B and D.

The cell D functional unit 150 functions as a serving cell for radio terminals 10 located in the cell D. Meanwhile, the cell D functional unit 150 functions as a non-serving cell for radio terminals 10 located in the cells A to C.

(Configuration of Cell)

Figure 4:
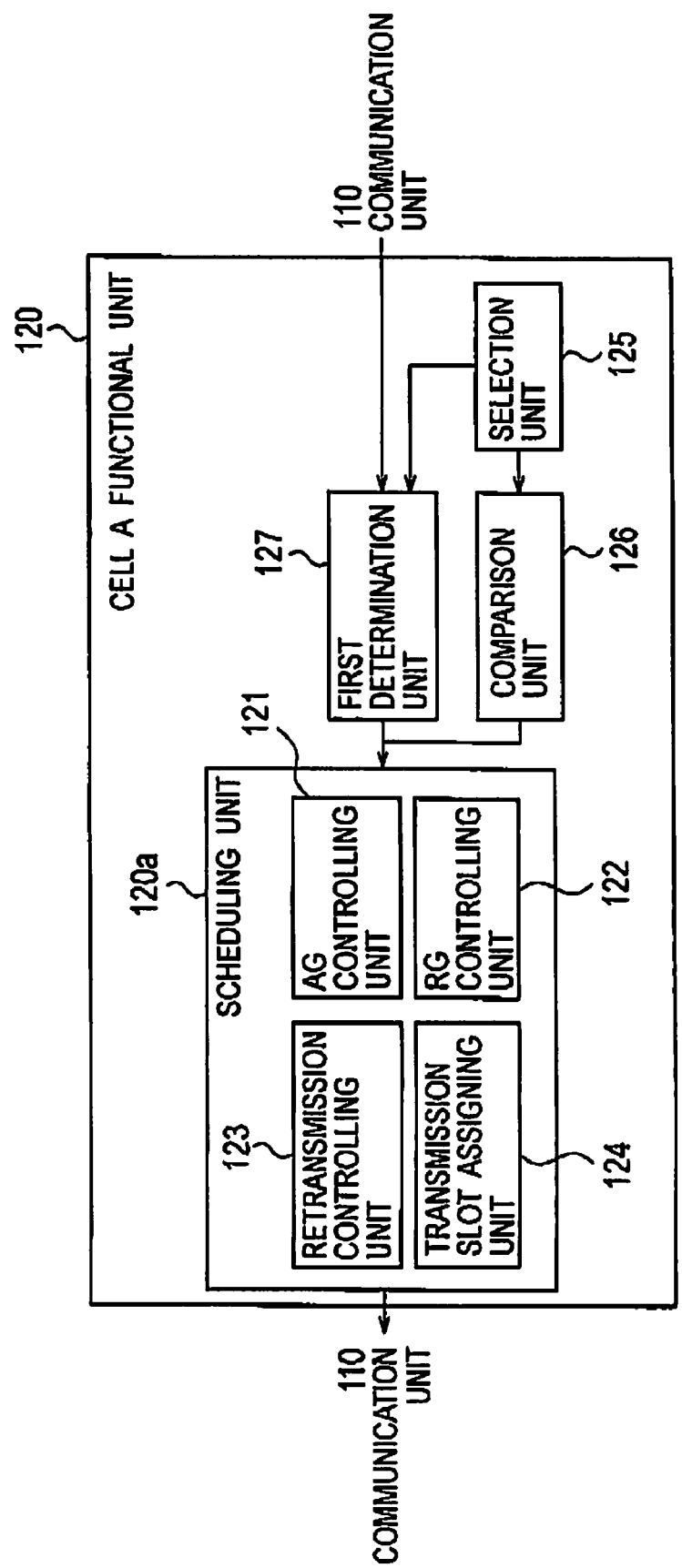
FIG. 4 is a block diagram showing a cell A functional unit 120 according to the first embodiment.

With reference to the accompanying drawings, description will be given of a configuration of the cell according to the first embodiment. FIG. 4 is a block diagram showing the cell (the cell A functional unit 120) according to the first embodiment. Here, description will be given for an example in which the cell A functional unit 120 functions as a serving cell.

As shown in FIG. 4, the cell A functional unit 120 includes: a scheduling unit 120a; a selection unit 125; a comparison unit 126; and a first determination unit 127. The scheduling unit 120a assigns the radio resource or the like to a radio terminal 10 of the cell A. Here, the radio terminal 10 uses the cell A as the serving cell.

The scheduling unit 120a includes an AG controlling unit 121, an RG controlling unit 122, a retransmission controlling unit 123 and a transmission slot assigning unit 124. The scheduling unit 120a is operated in a MAC-e (Media Access Control Enhanced) layer.

The AG controlling unit 121 transmits an AG via the E-AGCH to the radio terminal 10. Note that the AG is a command for directly specifying a value of the transmission rate without relying on the current transmission rate.

The RG controlling unit 122 transmits an RG via the E-RGCH to the radio terminal 10 (serving radio terminal of the cell A). Note that the RG includes the increase command "Up" for instructing the increase of the current transmission rate, the retention command "Hold" for instructing the retention of the current transmission rate, and the decrease command "Down" for instructing the decrease of the current transmission rate. As described above, the increase command "Up" instructs the increase of the transmission rate by a predetermined amount and the decrease command "Down" instructs the decrease by a predetermined amount. The predetermined amount for the increase may be the same as or smaller than the predetermined amount for the decrease.

The retransmission controlling unit 123 determines, for each block (for each process), whether or not an error is occurred in the uplink user data. Thereafter, the retransmission controlling unit 123 requests the radio terminal 10 to retransmit a block in which an error is occurred (hereinafter referred to as an error block). Here, a retransmission control technique is a HARQ (Hybrid Automatic Repeat Request) technique for combining a block firstly transmitted from the radio terminal 10 (hereinafter referred to as a transmission block) with a block retransmitted from the radio terminal 10 (hereinafter referred to as a retransmission block).

The transmission slot assigning unit 124 assigns, to the radio terminal 10, a transmission slot (that is, a process included in one TTI) to be used for transmitting the uplink user data (block) via the E-DPDCH. Note that the radio terminal 10 transmits the transmission block or the retransmission block to the base station 100 by using the process (active process) assigned by the transmission slot assigning unit 124.

The selection unit 125 selects a control target terminal and a comparison target terminal, from among the radio terminals 10 located as the serving terminal of the cell A. Here, the SG of the control target terminal is to be controlled and the SG of the comparison target terminal is to be compared with the control target terminal.

Here, the selection criterion for selecting the control target terminal and the comparison target terminal are arbitrarily determined. To be more specific, the selection unit 125 may randomly select the control target terminal and the comparison target terminal among the radio terminals 10.

On the other hand, the selection criterion for selecting the control target terminal may be previously determined. Specifically, the selection criterion for selecting the control target terminal is determined based on a criterion different from a priority class assigned to the radio terminal 10. For example, the selection criterion for selecting the control target terminal includes that excluding a specific radio terminal 10 whose transmission rate (SG) is not wished to be decreased, and the like.

Moreover, the selection criterion for selecting the comparison target terminal may be previously determined. Specifically, the selection criterion for selecting the comparison target terminal is determined based on a criterion different from the priority class assigned to the radio terminal 10. For example, the selection criterion for selecting the comparison target terminal includes that excluding a specific radio terminal 10 which requires a high transmission rate (SG) and is assumed to have a low happy bit rate, and the like.

The first determination unit 127 determines whether or not the SG assigned to the comparison target terminal is sufficient. Specifically, the first determination unit 127 determines whether or not a happy bit rate is lower than a predetermined threshold. Here, the happy bit rate indicates a ratio of happy bits indicating "Happy", to all the happy bits received from the comparison target terminal.

Here, the happy bit rate may be determined by "Happy"/ "Unhappy", or "Happy"/("Happy"+"Unhappy").

Here, the scheduling unit 120a transmits, to the control target terminal, the transmission rate control data (transmission rate decrease data) for decreasing the SG, when the priority class assigned to the control target terminal is lower than the priority class assigned to the comparison target terminal and when the happy bit rate is lower than a predetermined threshold. The transmission rate decrease data may be the AG or the RG.

As the transmission rate decrease data, for example, the AG controlling unit 121 transmits, to the control target terminal, an AG specifying an SG lower than the SG currently assigned to the control target terminal. Alternatively, the RG controlling unit 122 transmits, to the control target terminal, an RG (decrease command "Down") for decreasing the currently assigned SG.

Figure 5A:
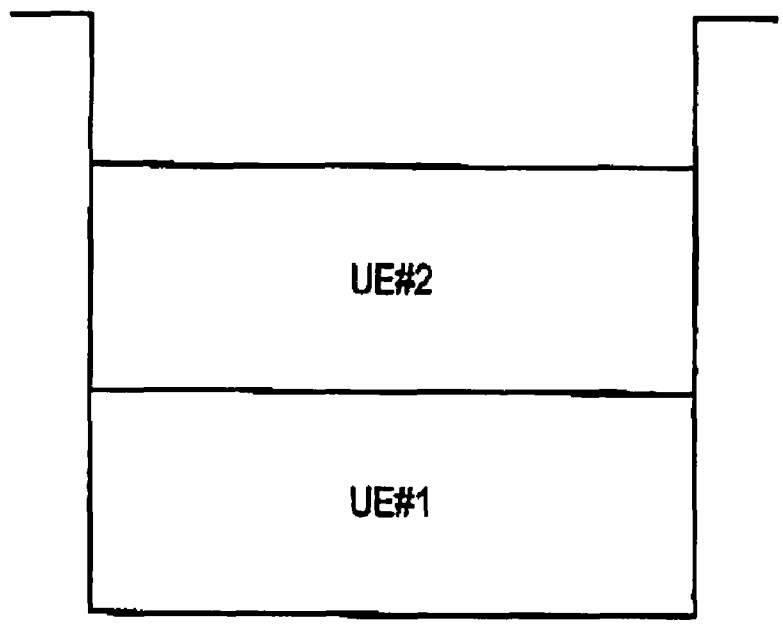
FIG. 5 is a view showing a state of assigned radio resources (SG) according to the first embodiment.
Figure 5B:
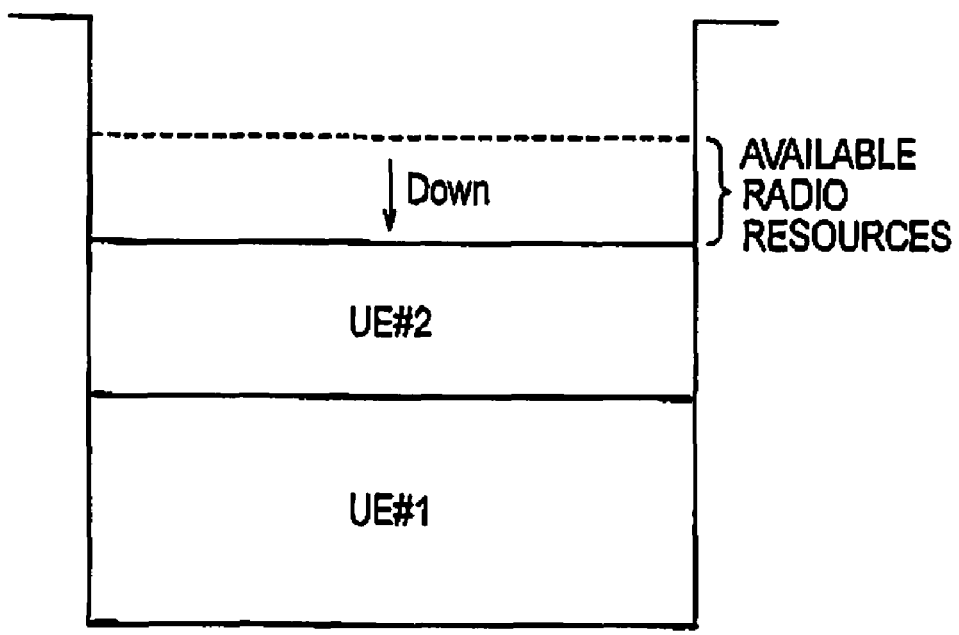

Here, with reference to FIGS. 5A and 5B, description will be given for an example in which the comparison target terminal is UE#1 and the control target terminal is UE#2. FIGS. 5A and 5B are views showing a state of assigned radio resources (SG) in the cell A.

Note that it is assumed that priority class assigned to the UE#1 is higher than priority class assigned to the UE#2. Further, it is also assumed that a happy bit rate of the UE#1 is lower than a predetermined threshold.

When the radio resources are assigned in a state shown in FIG. 5A, and when the preconditions described above (i.e.; (1) the priority class assigned to the comparison target terminal is higher than the priority class assigned to the control target terminal and (2) the happy bit rate of the comparison target terminal is lower than the predetermined threshold are satisfied), the base station 100 (the scheduling unit 120a) decreases the SG currently assigned to the control target terminal (the UE#2) by use of the AG or the RG as shown in FIG. 5B.

Thus, available radio resources that can be assigned to other radio terminal 10 located in the cell A, is secured. In other words, a remaining reception transmission rate is secured. Thereafter, the base station 100 (the scheduling unit 120a) assigns the available radio resources to the other radio terminal 10.

(Operations of Base Station 100 (Cell))

Figure 6:
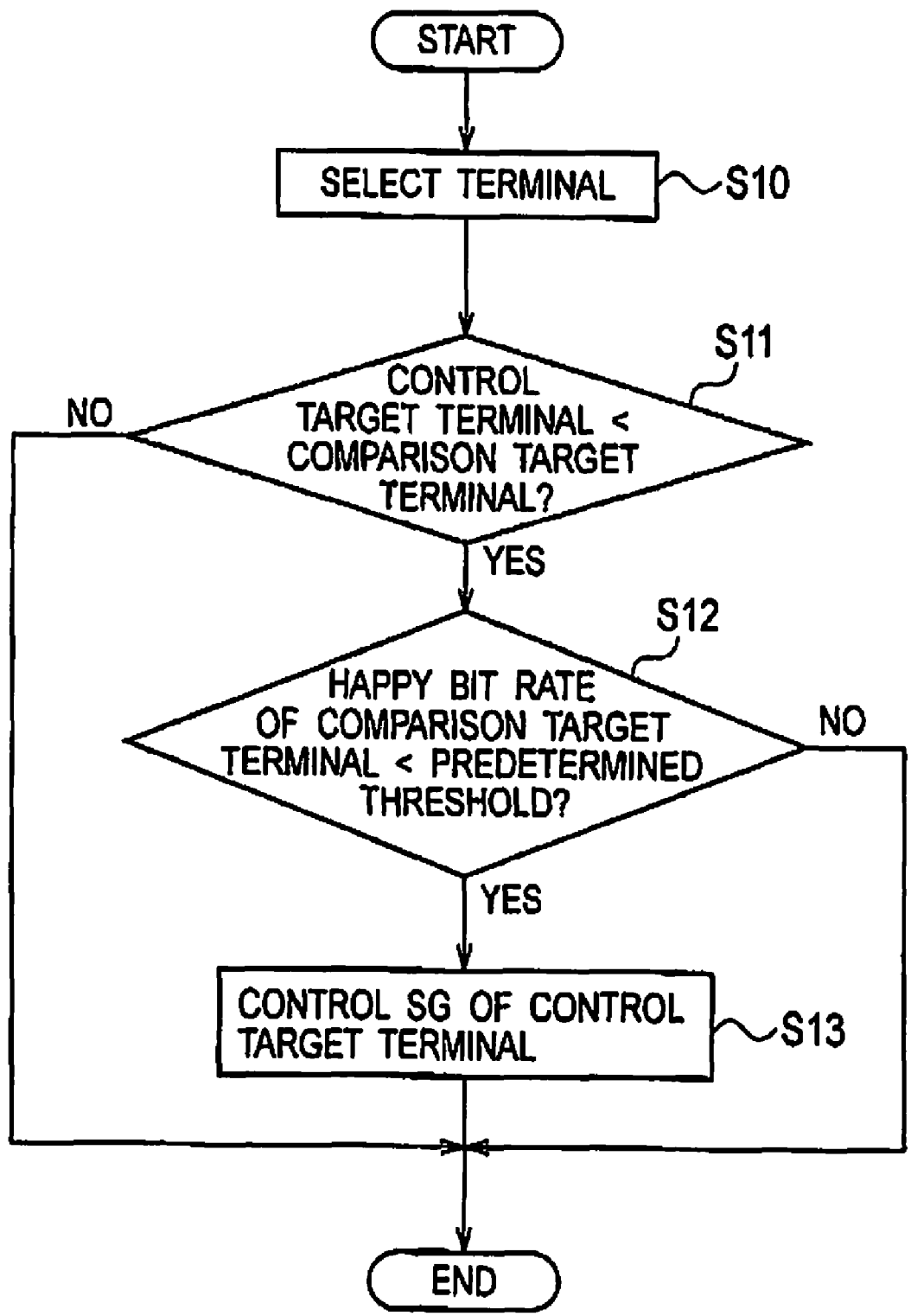
FIG. 6 is a flowchart showing operations of the base station 100 (cell) according to the first embodiment.

With reference to the accompanying drawing, description will be given of operations of the base station 100 (cell) according to the first embodiment. FIG. 6 is a flowchart showing operations of the base station 100 (cell) according to the first embodiment.

As shown in FIG. 6, in Step 10, the base station 100 selects the control target terminal and the comparison target terminal from the radio terminals 10 using the own cell as the serving cell.

In Step 11, the base station 100 determines whether or not the priority class assigned to the control target terminal is lower than priority class assigned to the comparison target terminal. When the priority class assigned to the control target terminal is lower than the priority class assigned to the comparison target terminal, the base station 100 moves to a processing in Step 12. On the other hand, when the priority class assigned to the control target terminal is not lower than the priority class assigned to the comparison target terminal, the base station 100 terminates the processing.

In Step 12, the base station 100 determines whether or not the happy bit rate is lower than a predetermined threshold. Here, the happy bit rate indicates a ratio of the happy bits indicating "Happy", to all of the happy bits received from the comparison target terminal. When the happy bit rate of the comparison target terminal is lower than the predetermined threshold, the base station 100 moves to a processing in Step 13. On the other hand, when the happy bit rate of the comparison target terminal is not lower than the predetermined threshold, the base station 100 terminates the processing.

In Step 13, the base station 100 transmits, to the control target terminal, the transmission rate control data for decreasing the SG. More specifically, the base station 100 transmits the AG or the RG to the control target terminal and decreases the SG currently assigned to the control target terminal.

Note that the processings in Steps 10 to 13 are repeated while changing the comparison target terminal from all of the serving radio terminals 10 one by one. Additionally, after the processings in Steps 10 to 13 are performed for all of serving radio terminals 10 by selecting each of the serving radio terminals 10 as the comparison target terminal, the processings in Steps 10 to 13 are repeated while changing the control target terminal from all of the serving radio terminals 10. More specifically, the processings in Steps 10 to 13 are repeated by selecting, as the control target terminal, the serving radio terminal that has not been selected as the control target terminal, and by selecting, as the comparison target terminal selected for each of the control target terminal, the radio terminals 10 except for current control target terminal.

When the processings in Steps 10 to 13 are performed for the all of the radio terminals 10 using the cell of the base station 100 as the serving cell, or when the processing of decreasing the SG for the number of E-AGCH is performed, the processing is terminated.

(Operations and Effects)

In the first embodiment, the scheduling unit 120a determines whether or not to transmit the transmission rate decrease data to the control target terminal, based on the comparison result of the priority classes of the control target terminal and the comparison target terminal, and the happy bit rate of the comparison target terminal.

Therefore, the radio resource can be properly assigned to the plurality of radio terminals, compared with controlling the transmission rate to be assigned to one of the plurality of radio terminals simply based on the control data received from the one of the plurality of radio terminals.

Second Embodiment

With reference to the accompanying drawings, a second embodiment will be described below. The following description is mainly given of differences between the first embodiment described above and the second embodiment.

Specifically, in the above-described first embodiment, the base station 100 decreases the SG assigned to the control target terminal when the following preconditions are satisfied. The preconditions are as follows: (1) the priority class assigned to the comparison target terminal is higher than the priority class is assigned to the control target terminal and (2) the happy bit rate of the comparison target terminal is lower than the predetermined threshold.

Meanwhile, in the second embodiment, when the preconditions described above are satisfied, the base station 100 further determines whether or not to decrease the SG assigned to the control target terminal.

(Configuration of Cell)

Figure 7:
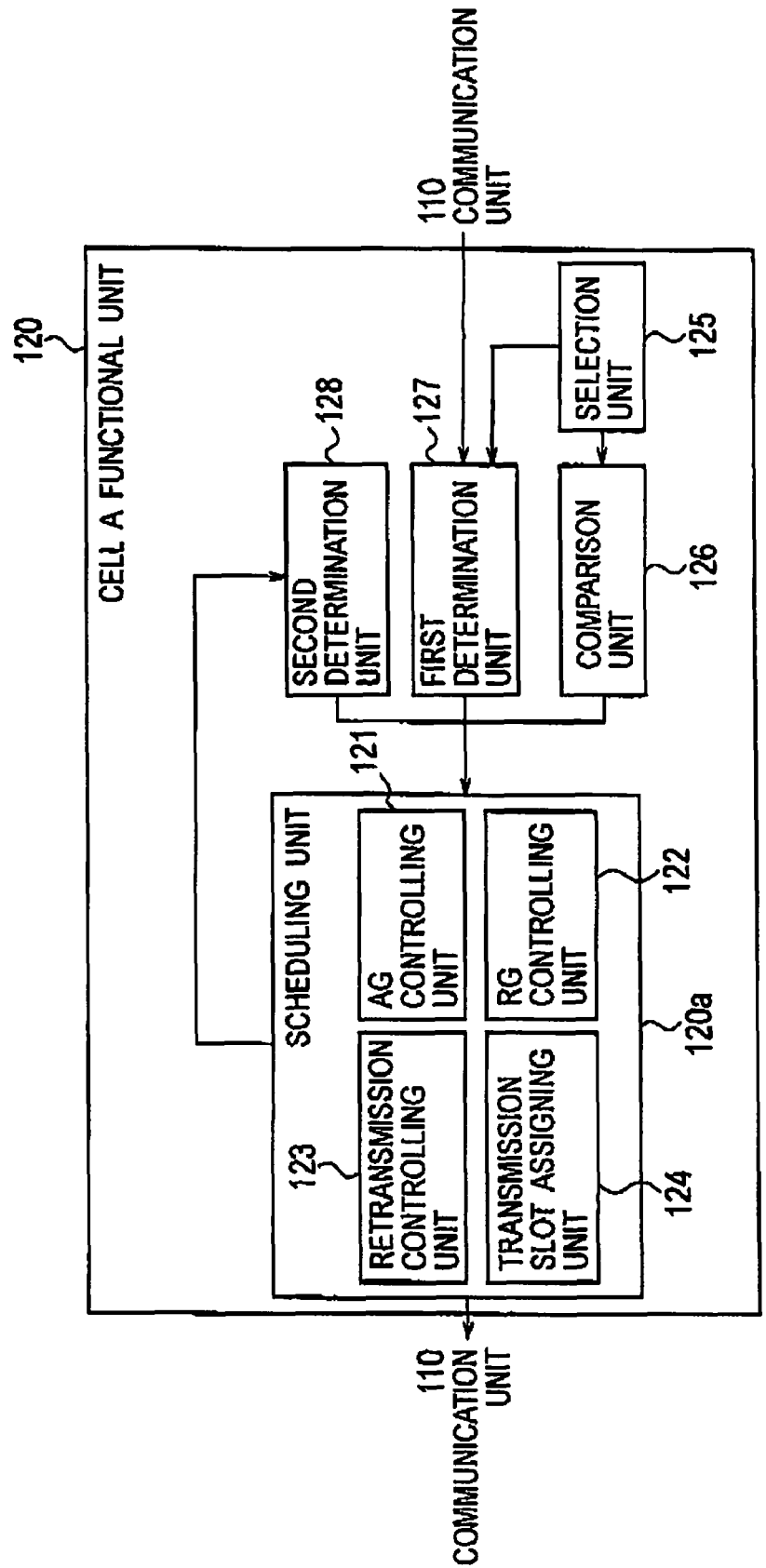
FIG. 7 is a block diagram showing a cell A functional unit 120 according to a second embodiment.

With reference to the accompanying drawings, description will be given for a configuration of a cell according to the second embodiment. FIG. 7 is a block diagram showing the cell (a cell A functional unit 120) according to the second embodiment. Note that, in FIG. 7, the same constituent components as those shown in FIG. 4 are denoted by the same reference numerals.

As shown in FIG. 7, the cell A functional unit 120 includes a second determination unit 128 in addition to the configuration shown in FIG. 4. The second determination unit 128 determines whether or not to decrease the SG assigned to the control target terminal, based on the SG currently assigned to the control target terminal. Specifically, when the SG currently assigned to the control target terminal is lower than a predetermined transmission rate, the second determination unit 128 determines not to decrease the SG assigned to the control target terminal. Here, the predetermined transmission rate indicates a transmission rate (minimum guaranteed transmission rate) that should be at least guaranteed for the control target terminal.

The second determination unit 128 may determine whether or not to decrease the SG assigned to the control target terminal, based on the SGs currently assigned to the control target terminal and the comparison target terminal. More specifically, when a difference between a sum of the already assigned SG (sum of the SG already assigned to the control target terminal and the comparison target terminal (receiving transmission rates)) and a maximum receivable transmission rate in the cell A exceeds a predetermined receiving transmission rate, the second determination unit 128 determines that the SG assigned to the control target terminal is not to be decreased.

Further, the above difference between the sum of the already assigned SG and the maximum receivable transmission rate in the cell A is referred to as a remaining reception transmission rate, and can be considered as available radio resources in the cell A.

When the second determination unit 128 determines that the SG assigned to the control target terminal is not to be decreased even when the above-described preconditions are satisfied, the scheduling unit 120a regulates a transmission of the transmission rate control data (transmission rate decrease data) for decreasing the SG assigned to the control target terminal.

Note that the SG assigned to the control target terminal and the SG assigned to the comparison target terminal are respectively controlled by the AG and the RG transmitted by the scheduling unit 120a. Thus, it should be noted that the scheduling unit 120a recognizes the SG (receiving transmission rate) already assigned to the control target terminal and the SG assigned to the comparison target terminal.

(Operations and Effects)

In the second embodiment, the second determination unit 128 determines whether or not to decrease the SG assigned to the control target terminal, based on the SG currently assigned to the control target terminal. When the second determination unit 128 determines not to decrease the SG assigned to the control target terminal, even when the preconditions ((1) the priority class assigned to the comparison target terminal is higher than the priority class assigned to the control target terminal and (2) the happy bit rate of the comparison target terminal is lower than the predetermined threshold) are satisfied, the scheduling unit 120a regulates the transmission of the transmission rate decrease data.

Therefore, an excessive decrease of the transmission rate assigned to the control target terminal can be suppressed.

Here, the following case is considered; one radio terminal and a different radio terminal are included in the radio terminal 10 and located in a cell. Here, the different radio terminal has a priority class lower than the one radio terminal and wastes radio resources (SG). Meanwhile, the one radio terminal is selected as the control target terminal. In such case, even when not decreasing a transmission rate assigned to the one radio terminal, the radio terminal having the priority class lower than the one radio terminal may be selected as the control target terminal, thereby the transmission rate assigned to the one radio terminal can be decreased. Thus, available radio resources (available receiving transmission rate) can be properly secured. Consequently, the use efficiency of the radio resources in the entire cell is improved.

In the second embodiment, the second determination unit 128 determines whether or not to decrease the SG assigned to the control target terminal, based on the SG currently assigned to the control target terminal and the SG currently assigned to the comparison target terminal. When the second determination unit 128 determines not to decrease the SG assigned to the control target terminal, even when the preconditions are satisfied, the scheduling unit 120a regulates the transmission of the transmission rate decrease data.

Therefore, when the available radio resources (available receiving transmission rate) are already sufficiently secured, an excessive decrease of the transmission rate assigned to the control target terminal can be suppressed.

Third Embodiment

With reference to the accompanying drawings, a third embodiment will be described below. The following description is mainly given of differences between the first embodiment and the third embodiment.

Specifically, in the first embodiment described above, the base station 100 compares the priority class assigned to the control target terminal with the priority class assigned to the comparison target terminal.

Meanwhile, in the third embodiment, a base station 100 performs weighting on a priority class respectively assigned to a control target terminal and to a comparison target terminal, and compares the weighted priority class of the control target terminal with the weighted priority class of the comparison target terminal.

(Configuration of Cell)

Figure 8:
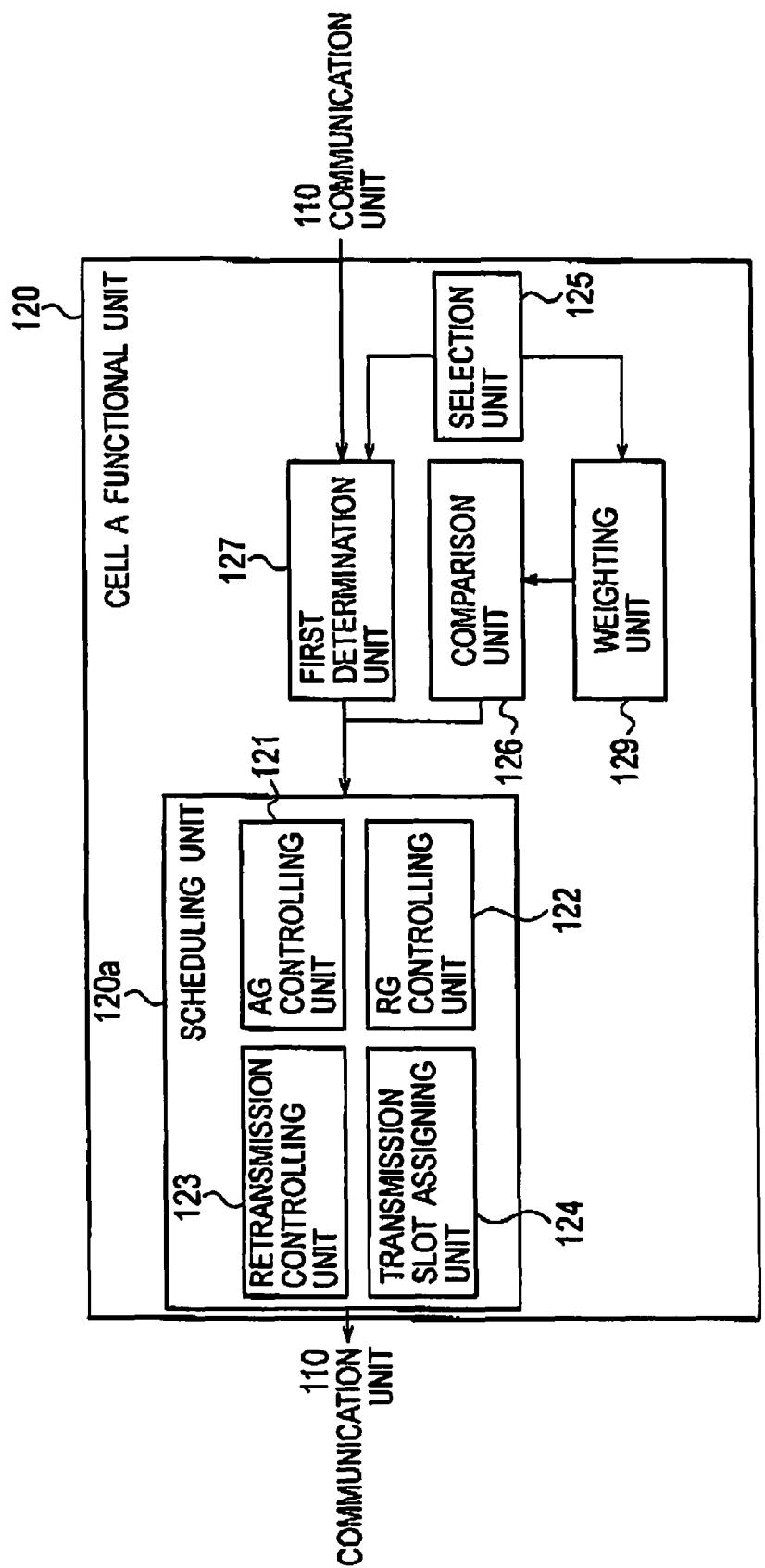
FIG. 8 is a block diagram showing a cell A functional unit 120 according to a third embodiment.

With reference to the accompanying drawings, description will be given of a configuration of a cell according to the third embodiment. FIG. 8 is a block diagram showing the cell (a cell A functional unit 120) according to the third embodiment. Note that, in FIG. 8, the same constituent components as those shown in FIG. 4 are denoted by the same reference numerals.

As shown in FIG. 8, the cell A functional unit 120 includes a weighting unit 129 in addition to the configuration shown in FIG. 4. The weighting unit 129 performs a weighting on the priority class respectively assigned to the control target terminal and to the comparison target terminal, based on weighted values assigned to each of the radio terminal 10. Thus, the weighting unit 129 acquires the weighted priority class of the control target terminal and the weighted priority class of the comparison target terminal.

Note that the weighted value is assigned to each of the radio terminal 10 based on a criterion different from the priority class. For example, the weighted value is used for dynamically changing the priority class according to a type of contract or a temporary situation.

The comparison unit 126 compares the weighted priority class of the control target terminal with the weighted priority class of the comparison target terminal.

The scheduling unit 120a decreases the SG assigned to the control target terminal when the following preconditions are satisfied.

The preconditions are as follows: (1) the priority class assigned to the comparison target terminal is higher than the priority class assigned to the control target terminal and (2) the happy bit rate of the comparison target terminal is lower than the predetermined threshold.

(Operations and Effects)

In the third embodiment, the weighting unit 129 acquires the weighted priority class of the control target terminal and the weighted priority class of the comparison target terminal, by performing the weighting on the priority classes by using the weighted values assigned to the radio terminal 10 based on the criterion different from the priority class. The scheduling unit 120a transmits the transmission rate decrease data to the control target terminal, when the weighted priority class of the comparison target terminal is higher than the weighted priority class of the control target terminal and when the happy bit rate of the comparison target terminal is lower than the predetermined threshold.

Therefore, by using the weighted values, it is possible to make a dynamic change on determining whether or not to decrease the transmission rate (SG) assigned to the control target terminal. Thus, a degree of freedom of transmission rate control is improved.

Other Embodiments

The present invention has been described by use of the embodiments described above. However, it should be understood that the present invention is not limited to the description and drawings which constitute a part of this disclosure. From this disclosure, various alternative embodiments, examples and operational technologies will become apparent to those skilled in the art.

For example, in the embodiment described above, the first determination unit 127 provided in the base station 100 determines whether or not the happy bit rate of the comparison target terminal is lower than the predetermined threshold. However, the present invention is not limited thereto. The first determination unit 127 may determine whether or not an unhappy bit rate of the comparison target terminal exceeds a predetermined threshold. The unhappy bit rate may be "Unhappy"/"Happy" or "Unhappy"/("Happy"+"Unhappy"). Note that the comparison between the happy bit rate and the predetermined threshold is the same as comparison between the unhappy bit rate and the predetermined threshold. Thus, it is not required to particularly make a distinction therebetween.

In the embodiments described above, the description was given of, for example, the configuration and operations of the serving cell as the configuration and the operations (FIGS. 4, 6 and the like) of the base station 100 according to the embodiments described above. However, the present invention is not limited thereto. The configuration and the operations of the base station 100 according to the embodiments described above may be achieved by use of a non-serving cell or by cooperation between the serving cell and the non-serving cell.

What is claimed is:

1. A radio communication system in which a base station transmits, to a radio terminal, transmission rate control data for controlling a transmission rate of uplink user data, wherein the radio terminal includes a terminal side transmitting unit configured to transmit, to the base station, control data indicating whether the transmission rate assigned to the radio terminal is sufficient, and the base station includes:

a comparison unit configured to compare a first priority class assigned to a control target terminal with a second priority class assigned to a comparison target terminal, the control target terminal being the radio terminal whose transmission rate is to be controlled and the comparison target terminal being the radio terminal whose transmission rate is to be compared with the control target terminal;

a first determination unit configured to determine whether a happy bit rate is lower than a predetermined threshold, the happy bit rate being a ratio of control data indicating that the transmission rate is sufficient for the comparison target terminal, to all of control data consisting of the control data indicating the transmission data is sufficient and control data indicating that the transmission rate is insufficient received from the comparison target terminal; and a base station side transmitting unit configured to transmit, to the control target terminal, transmission rate decrease data for decreasing the transmission rate, when the first priority class assigned to the control target terminal is lower than the second priority class assigned to the comparison target terminal and when the happy bit rate is lower than the predetermined threshold, wherein the transmission rate control signal is transmitted to the control target terminal and the comparison target terminal, and the control data is transmitted from the control target terminal or the comparison target terminal.

2. The radio communication system according to claim 1, wherein
the base station further includes a second determination unit configured to determine whether or not to decrease the transmission rate assigned to the control target terminal, based on a current transmission rate assigned to the control target terminal, and
the base station side transmitting unit regulates a transmission of the transmission rate decrease data to the control target terminal as the second determination unit determines not to decrease the transmission rate assigned to the control target terminal, when the first priority class assigned to the control target terminal is lower than the second priority class assigned to the comparison target terminal and when the happy bit rate is lower than the predetermined threshold.

3. The radio communication system according to claim 1, wherein
the base station further includes a weighting unit configured to perform a weighting on the first priority class assigned to the control target terminal and on the second priority class assigned to the comparison target terminal, by use of a weighted value determined based on a criterion different from the priority class, and to acquire a first weighted priority class of the control target terminal and a second weighed priority class of the comparison target terminal,
the comparison unit compares the first weighted priority class of the control target terminal with the second weighted priority class of the comparison target terminal, and
the base station side transmitting unit transmits the transmission rate decrease data to the control target terminal when the first weighted priority class assigned to the control target terminal is lower than the second weighted priority class assigned to the comparison target terminal and when the happy bit rate is lower than the predetermined threshold.

4. The radio communication system according to claim 1, wherein
the base station further includes a selection unit configured to select the control target terminal and the comparison target terminal based on a predetermined selection criterion.

5. A radio communication method in which a base station transmits, to a radio terminal, transmission rate control data for controlling a transmission rate of uplink user data, the method comprising:
transmitting, from the radio terminal to the base station, control data indicating whether a transmission rate assigned to the radio terminal is sufficient;
comparing, at the base station, a first priority class assigned to a control target terminal with a second priority class assigned to a comparison target terminal, the control target terminal being the radio terminal whose transmission rate is to be controlled and the comparison target terminal being the radio terminal whose transmission rate is to be compared with the control target terminal;
determining, at the base station, whether a happy bit rate is lower than a predetermined threshold, the happy bit rate being a ratio of control data indicating that the transmission rate is sufficient for the comparison target terminal, to all of control data consisting of the control data indicating the transmission data is sufficient and control data indicating that the transmission rate is insufficient received from the comparison target terminal; and
transmitting, from the base station to the control target terminal, transmission rate decrease data for decreasing the transmission rate, when the first priority class assigned to the control target terminal is lower than the second priority class assigned to the comparison target terminal and when the happy bit rate is lower than the predetermined threshold, wherein
the transmission rate control signal is transmitted to the control target terminal and the comparison target terminal, and
the control data is transmitted from the control target terminal or the comparison target terminal.

6. A base station configured to transmit, to a radio terminal, transmission rate control data for controlling a transmission rate of uplink user data, comprising:
a receiving unit configured to receive, from the radio terminal, control data indicating whether a transmission rate assigned to the radio terminal is sufficient,
a comparison unit configured to compare a first priority class assigned to a control target terminal with a second priority class assigned to a comparison target terminal, the control target terminal being the radio terminal whose transmission rate is to be controlled and the comparison target terminal being the radio terminals whose transmission rate is to be compared with the control target terminal;
a first determination unit configured to determine whether a happy bit rate is lower than a predetermined threshold, the happy bit rate being a ratio of control data indicating that the transmission rate is sufficient for the comparison target terminal, to all of control data consisting of the control data indicating the transmission data is sufficient and control data indicating that the transmission rate is insufficient received from the comparison target terminal; and
a base station side transmitting unit configured to transmit, to the control target terminal, transmission rate decrease data for decreasing the transmission rate, when the first priority class assigned to the control target terminal is lower than the second priority class assigned to the comparison target terminal and when the happy bit rate is lower than the predetermined threshold, wherein
the transmission rate control signal is transmitted to the control target terminal and the comparison target terminal, and
the control data is transmitted from the control target terminal or the comparison target terminal.

* * * * *